(12) United States Patent
Nakata et al.

(10) Patent No.: US 9,073,213 B2
(45) Date of Patent: Jul. 7, 2015

(54) METHOD OF DETERMINING FAILURE OF ROBOT

(75) Inventors: Hiroyuki Nakata, Osaka (JP); Yasuhiro Kinugasa, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 707 days.

(21) Appl. No.: 12/677,379

(22) PCT Filed: May 20, 2009

(86) PCT No.: PCT/JP2009/002215
§ 371 (c)(1),
(2), (4) Date: Mar. 10, 2010

(87) PCT Pub. No.: WO2009/142006
PCT Pub. Date: Nov. 26, 2009

(65) Prior Publication Data
US 2011/0054680 A1    Mar. 3, 2011

(30) Foreign Application Priority Data

May 21, 2008    (JP) .................................. 2008-132783

(51) Int. Cl.
*B25J 9/00*    (2006.01)
*B25J 9/16*    (2006.01)

(52) U.S. Cl.
CPC ..... *B25J 9/1674* (2013.01); *G05B 2219/37344* (2013.01); *G05B 2219/37525* (2013.01); *G05B 2219/41372* (2013.01); *G05B 2219/45104* (2013.01)

(58) Field of Classification Search
CPC .................. B25J 9/1674; G05B 2219/37344; G05B 2219/37525; G05B 2219/41372
USPC ............ 700/30, 31, 174, 175, 177, 245, 254; 318/563, 565, 566, 568.1, 568.24, 569, 318/589, 400.15; 702/41, 183–185
See application file for complete search history.

(56) References Cited

U.S. PATENT DOCUMENTS

| | | | |
|---|---|---|---|
| 6,236,011 B1 | 5/2001 | Kato et al. | |
| 6,892,110 B2 | 5/2005 | Inoue et al. | |
| 2003/0163286 A1 | 8/2003 | Yasugi | |
| 2004/0174130 A1 | 9/2004 | Inoue et al. | |

FOREIGN PATENT DOCUMENTS

| | | |
|---|---|---|
| CN | 1550287 A | 12/2004 |
| JP | 63-123105 | 5/1988 |

(Continued)

OTHER PUBLICATIONS

Chinese Office Action for Application No. 200980118477.7.

(Continued)

*Primary Examiner* — Spencer Patton
(74) *Attorney, Agent, or Firm* — RatnerPrestia

(57) ABSTRACT

A failure of a robot can be determined while a production line is operating by determining when a motor output torque moving average value, which is an average value of N (N is a positive integer) pieces of motor output torque values, exceeds a first failure determination reference value, and an external force torque estimated moving average value, which is an average value of N pieces of external force torque estimated values, exceeds a second failure determination reference value.

4 Claims, 9 Drawing Sheets

(56) References Cited

FOREIGN PATENT DOCUMENTS

| | | |
|---|---|---|
| JP | 04-364055 | 12/1992 |
| JP | 9174482 A | 7/1997 |
| JP | 11-058024 | 3/1999 |
| JP | 11-129186 | 5/1999 |
| JP | 2003-117879 A | 4/2003 |
| JP | 2003-117879 A | 4/2003 |
| JP | 2003-326438 A | 11/2003 |

OTHER PUBLICATIONS

European Application Serial No. 09750368.4, European Search Report dated Nov. 25, 2011, 8 pgs.

International Search Report for International Application No. PCT/JP2009/002215, Jun. 23, 2009, Panasonic Corporation.

Kazuhiro Kosuge et al., "Dynamic Collision Detection Method for Manipulator," Department of Machine Intelligence and System Engineering, Tohoku University, Aoba-yama 01, Sendai 980-8579 (with English abstract).

METHOD OF DETERMINING FAILURE OF ROBOT

THIS APPLICATION IS A U.S. NATIONAL PHASE APPLICATION OF PCT INTERNATIONAL APPLICATION PCT/JP2009/002215.

TECHNICAL FIELD

The present invention relates to a method of determining a failure of a motor-driven robot, particularly of an articulated robot.

BACKGROUND ART

In recent years, the need has been increasing for reducing production lead time. However, in an articulated (vertical or horizontal) robot used for welding or handling, the production needs to be stopped for several hours to replace a faulty mechanism element such as a motor and speed reducer for driving the robot, becoming a major problem.

When an element such as a motor and speed reducer becomes faulty, the frictional force rises to increase the motor drive force in most cases. Under the circumstances, if an unusual condition of the motor drive force can be recognized before the robot becomes completely inoperable, a mechanism element such as a motor can be replaced while the production line is nonoperating (e.g. on a day off, in the nighttime), thus reducing the effects on the production.

Thus, a method is known of detecting a failure of a robot focusing attention on fluctuation of a velocity waveform of a motor caused by a failure (refer to patent literature 1 for example). Another method is known of detecting a failure of a robot focusing attention on the difference between a power at the drive side (motor output power) and a power at the load side (a power obtained by a motion equation of a robot (refer to patent literature 2 for example).

The former method of determining a failure from fluctuation of a velocity waveform has the following problems. The first one is that velocity waveform data in a normal state as reference data needs to be measured and stored for each robot. The second one is that a robot needs to be operated with a reference operation pattern to determine a failure. Accordingly, failure determination naturally cannot be performed while the production line is operating because velocity waveform data of a motor while the production line is operating is different from that for failure determination. Meanwhile, even if the production line can afford time to perform failure determination (e.g. nonoperating production line), a robot needs to be operated with a reference operation pattern only for failure determination, which results in a cost for worker-hours for failure measurement. In a production field where the production line operates for a long time and severely in cutting cost, it is practically difficult to perform the above two points only for determining a failure of a robot.

In the latter method of determining a failure from the difference in power, the former problem is solved; reference data does not need to be measured or stored; and determination is possible while the production line is operating. However, a power at the load side cannot be necessarily calculated accurately although a power at the drive side can be. This is because calculation of a power by a motion equation of a robot produces an error unless parameters (e.g. mass, barycenter position, inertia) of a load (e.g. welding torch, handling tool, workpiece)are accurate. In patent literature 2, a load torque value is calculated from a motion equation, angle, angular velocity, and angular acceleration for a mass point model of the mechanism element including an attached load, and then the load torque value is multiplied by the angular velocity to determine a power at the load side.

For an industrial robot of recent years, accurate load parameters are requested for optimizing acceleration and deceleration and for a higher degree of precision in collision detection. Accordingly, a lot of robots are found equipped with a device for inputting load parameters or a function of automatically measuring load parameters. However, whether load parameters are input or an automatic measurement function is used depends on a user, and accurate load parameters are not necessarily input. A large difference between a set parameter and its actual parameter for a load results in a large error in a power at the load side, which can cause erroneous decision as a failure.

A power at the drive side increases not only because a friction increase due to a failure of a motor or speed reducer driving the robot increases the motor drive force. That is also because the motor drive force increases or decreases responding to an external force in a case such as where the robot contacts another object and a tensile force is exerted on a cable attached to the robot. However, in the former case where friction increases, the motor drive force increases as well to compensate the increased friction energy. Meanwhile, in the latter case where an external force is exerted, a power at the drive side does not necessarily increase. For example, a tensile force increase of the cable bears the gravitational force of the robot to possibly decrease a power at the drive side. Even in such a case, the difference between a power at the drive side and that at the load side increases, which can cause erroneous decision as a failure even if caused by other than a mechanism failure.

FIG. 11 is an explanatory drawing of the above-described case where a tensile force increase of a cable bears the gravitational force of a robot, showing an outline structure of a conventional welding robot system.

In FIG. 11, welding wire 101 as a consumable electrode is sent from wire spool 102 to welding torch 104 through torch cable 111 (shown by dotted lines) with a hollow structure by wire feeding motor 103. Welding power supply unit 105 applies given welding current I and welding voltage V between welding wire 101 and base material 107 (welded object) through welding torch 104 and welding tip 106 to generate arc 108. Further, welding power supply unit 105 controls wire feeding motor 103 to perform welding. Robot 109 holds welding torch 104 to position it to a welding start point (not shown) and moves welding torch 104 along a weld line (not shown). Such controlling of the entire robot is performed by robot control unit 110.

At this moment, a user often places, for example, jig 112 for hanging torch cable 111 from above for ensuring the feeding performance by maintaining the shape of welding wire 101, and for avoiding interference with surrounding objects. Here, torch cable 111 moves according to operation of robot 109. Consequently, jig 112 is usually made of an elastic body such as a spring and rubber. Accordingly, a force pulling upward is exerted on welding torch 104 and robot 109 holding it as well through torch cable 111 to bear the gravitational force of robot 109. Particularly, the tip of a robot to which welding torch 104 is attached is loaded with a motor with a small capacity, and thus such a change in tensile force of torch cable 111 is nonnegligible. Such jig 112 is selected, mounted, and exchanged by a user. Hence, using, mounting, or exchanging jig 112 can cause erroneous decision as a failure.

Citation List

Patent Literature

[Patent literature 1] Japanese Patent Unexamined Publication No. S 63-123105
[Patent literature 2] Japanese Patent Unexamined Publication No. H 11-129186

Nonpatent Literature

[Nonpatent literature 1] Dynamic Collision Detection Method for Manipulator, Kazuhiro Kosuge and another, The Japan Society of Mechanical Engineers [No. 99-9], Collection of papers from Lecture on Robotics and Mechatronics '99 2A1-11-030

SUMMARY OF THE INVENTION

The present invention provides a method of determining a failure of a robot in which reference data does not need to be measured or stored; determination is possible while the production line is operating; and the possibility of erroneous decision as a failure is reduced even if accurate load parameters are not input or an external force is exerted.

The present invention includes a step of determining while a robot is operating whether or not a motor output torque average value (i.e. an average value of N (N is a positive integer) pieces of motor output torque values exceeds a first failure determination reference value (a value produced by adding a first given value to a motor output torque average reference value obtained from given N pieces of motor output torque average values); a step of determining while a robot is operating whether or not an external force torque estimated average value (i.e. an average value of N pieces of external force torque estimated values) exceeds a second failure determination reference value (a value produced by adding a second given value to an external force torque average reference value obtained from given N pieces of external force torque estimated average values); and a step of determining as a failure if the motor output torque average value exceeds the first failure determination reference value, and the external force torque estimated average value exceeds the second failure determination reference value.

Such configuration does not require measuring or storing reference data and allows determining a failure while the production line is operating. Further, the possibility of erroneous decision as a failure is reduced even if accurate load parameters are not input or an external force is exerted.

DETAILED DESCRIPTION OF PREFERRED EMBODIMENT

Hereinafter, a description is made of the present invention using the related drawings. However, the present invention is not limited to this description.

Exemplary Embodiment

Figure 1:
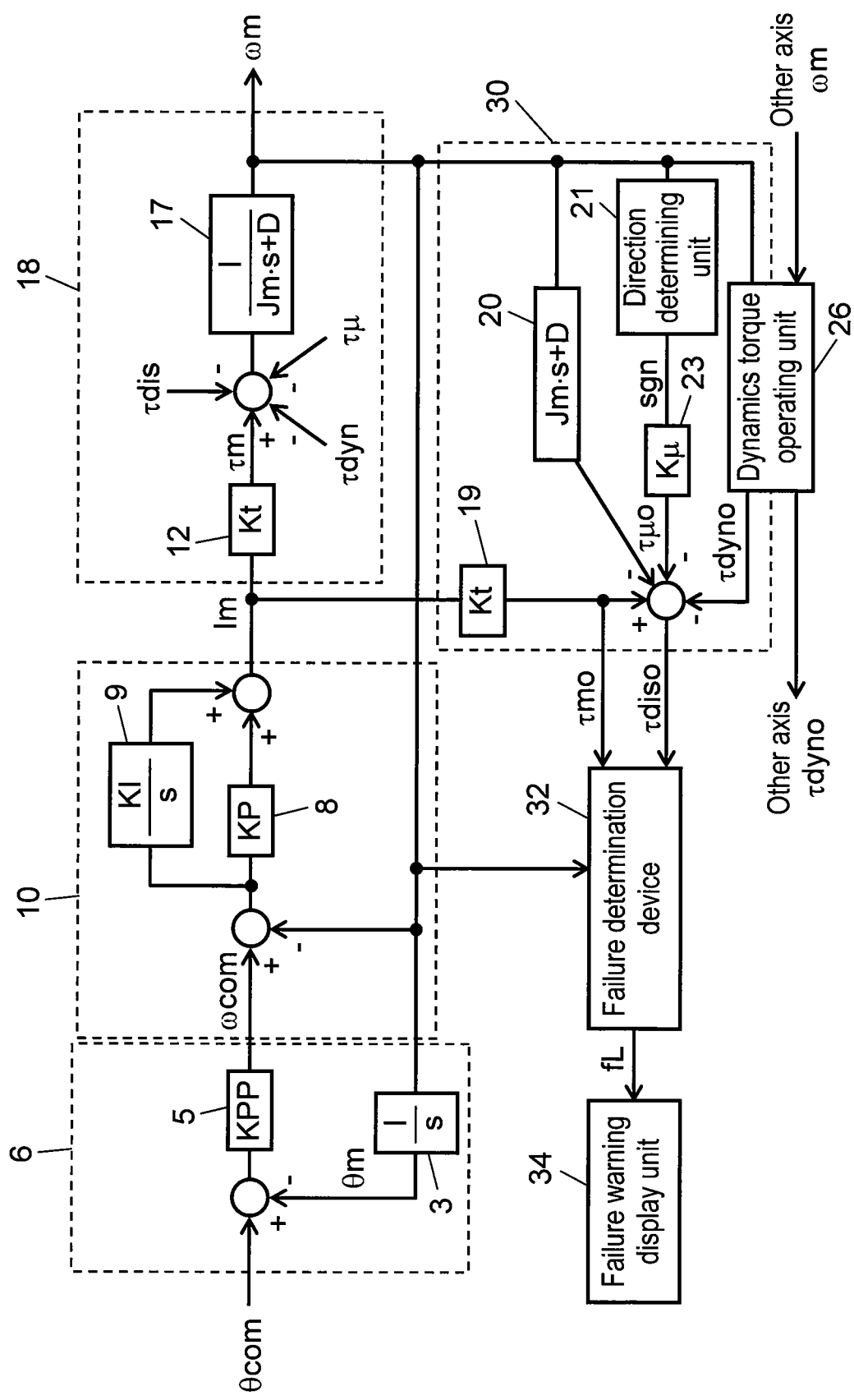
FIG. 1 is a block diagram illustrating robot failure determination according to one embodiment of the present invention.
Figure 2:
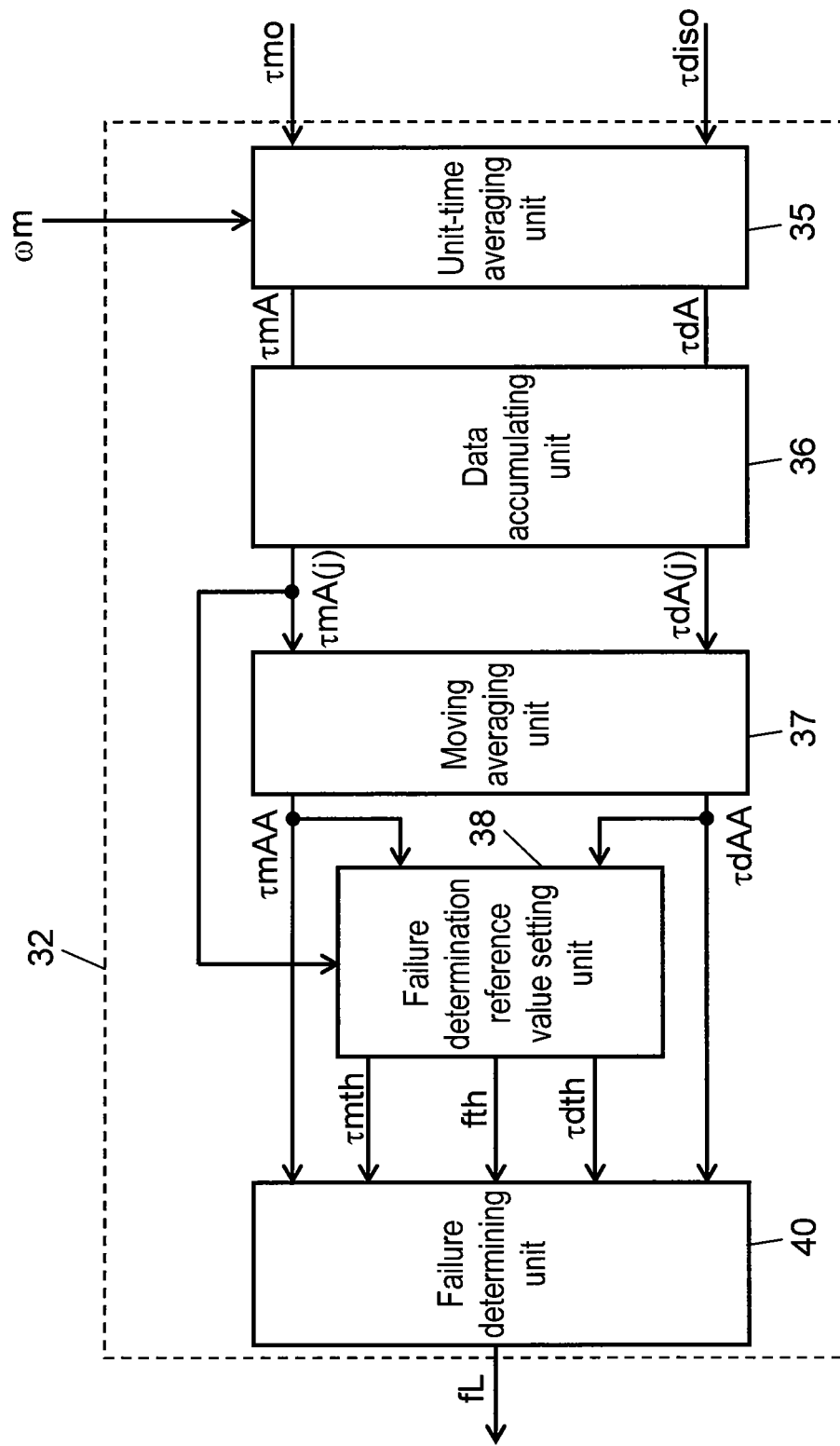
FIG. 2 is a block diagram showing details of the failure determining unit in FIG. 1.
Figure 3:
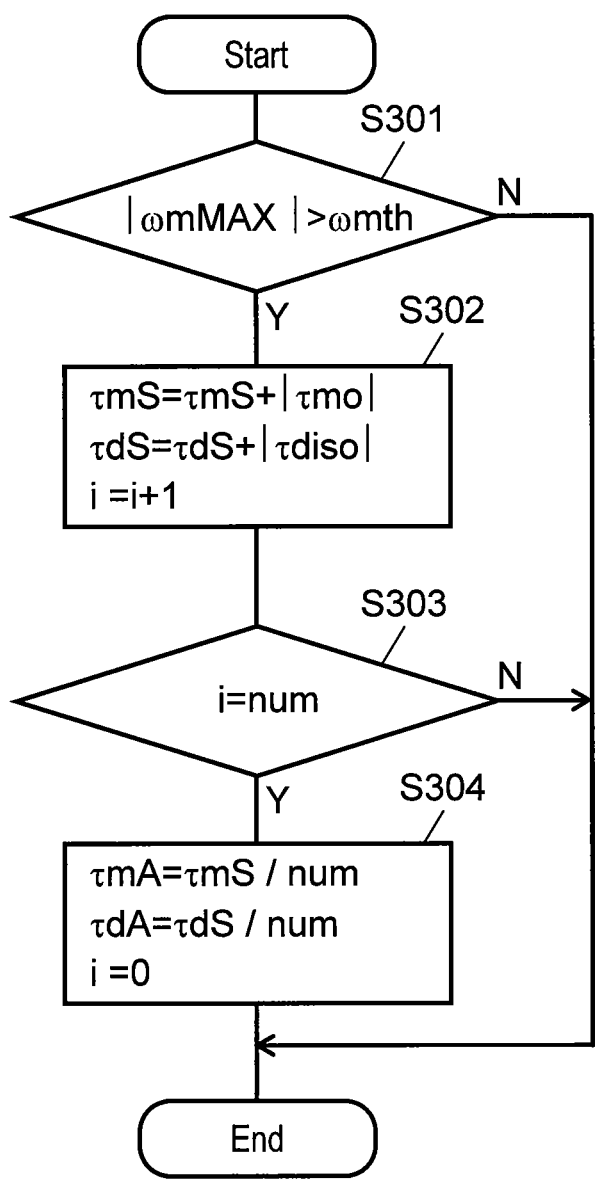
FIG. 3 is a flowchart illustrating within-a-unit-time average value calculating process in the method of determining a failure of a robot according to the embodiment.
Figure 4:
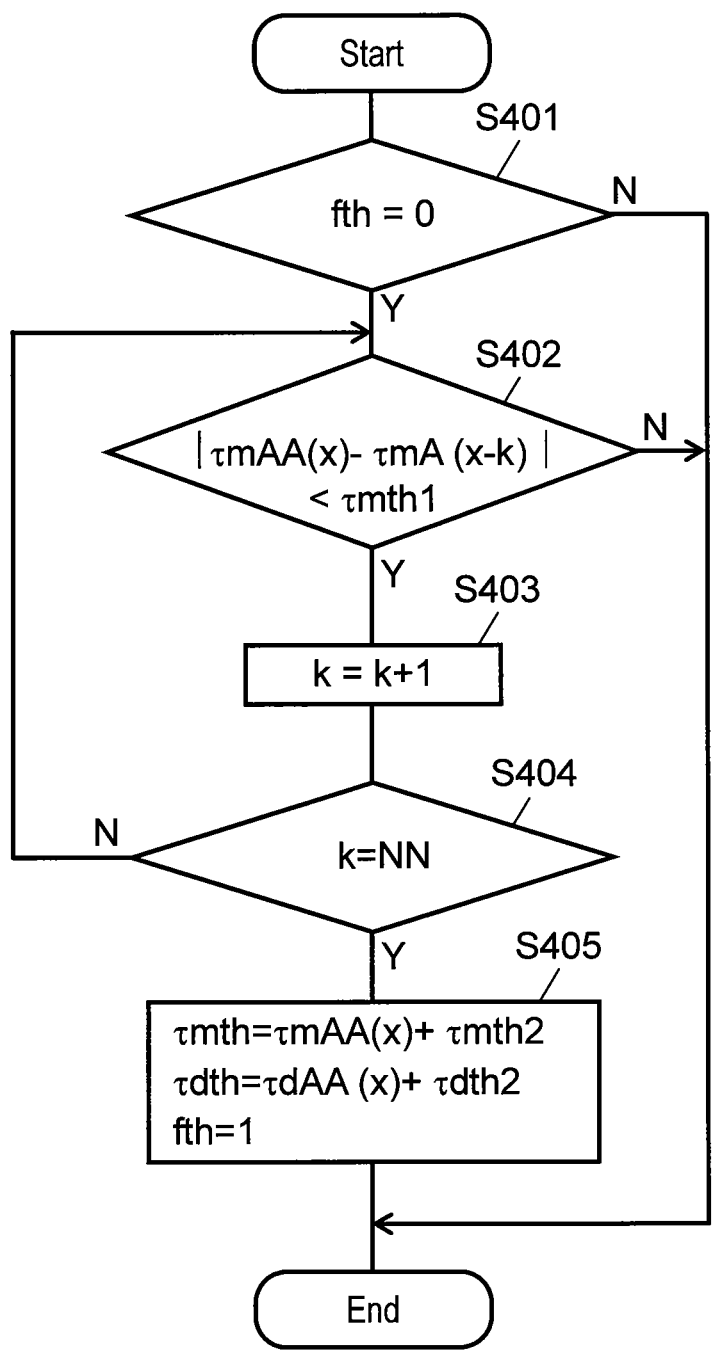
FIG. 4 is a flowchart illustrating the failure determination reference value setting process in the method of determining a failure of a robot according to the embodiment.

FIG. 1 is a block diagram showing a method of determining a failure of a robot according to one embodiment of the present invention, showing a position control loop including robot failure determination. FIG. 2 is a block diagram showing the failure determination in the FIG. 1. FIG. 3 is a flowchart illustrating within-a-unit-time average value calculating process for a motor output torque value and an external force torque value, in the method of determining a failure of a robot according to the embodiment. FIG. 4 is a flowchart showing failure determination reference value setting process on the basis of a moving average value, for a motor output torque value and an external force torque value, in the method of determining a failure of a robot according to the embodiment. The term "average value" is used herein only inasmuch as it may be unclear to one of ordinary skill in the art that the term "average" on its own would refer to a value.

Figure 11:
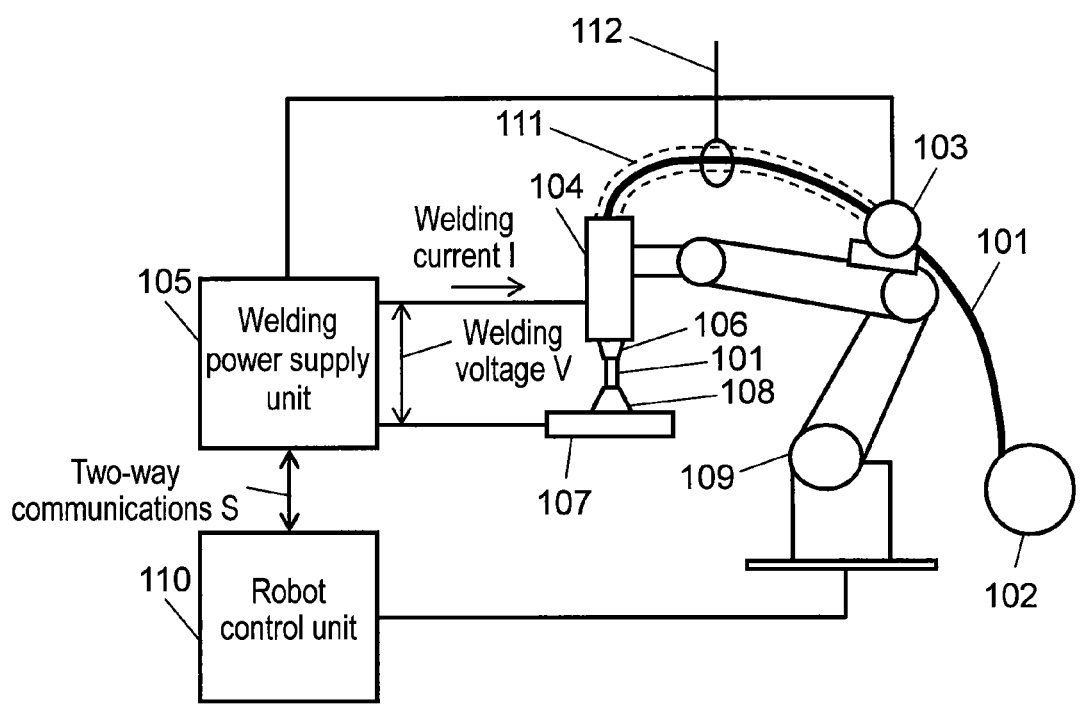
FIG. 11 is a block diagram showing a conventional welding robot system.

Here, the method of determining a failure of a robot described in the embodiment is applicable to a welding system similarly to a conventional one shown in FIG. 11. That is, this embodiment is different from a conventional one in the control method by robot control unit 110 in the welding system shown in FIG. 11. Hence, this embodiment is described for the configuration of the welding system shown in FIG. 11 as an example.

In FIG. 1, position instruction θcom is obtained on the basis of a starting point and an end point indicated by a user. Position control unit 6 exercises proportional control (P control) with position instruction θcom and motor angular velocity ωm fed back from motor/external force torque unit 18 being input, to output velocity instruction ωcom. Velocity control unit 10 exercises proportional/integral control (PI control) with velocity instruction ωcom and motor angular velocity ωm fed back being input, to generate motor current instruction Im.

Hereinafter, a detailed description is made of operation in the block diagram of FIG. 1. In FIG. 1, position control unit 6 generates velocity instruction ωcom on the basis of a value of difference between position instruction θcom (e.g. a joint angle of a robot loaded with a torch) and motor position θm obtained by integrating motor angular velocity ωm (e.g. angular velocity of the angular axis of a robot) fed back.

Velocity control unit 10 generates motor current instruction Im on the basis of a value of difference between velocity instruction ωcom and motor angular velocity ωm fed back.

Motor/external force torque unit 18 includes welding torch 104 and a motor rotating welding torch 104. At motor/external force torque unit 18, motor output torque value τm generated by the motor, external force torque value τdis exerted on welding torch 104, and moving friction torque value τμ occur. Motor/external force torque unit 18 outputs motor angular velocity ωm for controlling motor velocity on the basis of these torque values and feeds back motor angular velocity ωm to position control unit 6 and velocity control unit 10. Motor/external force torque unit 18 is a load driven by the control system and indicates how actual angular velocity ωm changes by motor output torque value τm generated from motor current instruction Im. As used herein, the term "external force torque" refers to the torque exerted on the robot, e.g., on the welding torch.

External force torque estimating unit 30 estimates external force torque value τdis sensorlessly, namely outputs external force torque estimated value τdiso (i.e. an estimated value of external force torque value τdis).

Meanwhile, as a method of estimating an external force torque value sensorlessly, dynamics operation method and disturbance estimation observer method are known. Dynamics operation method determines an external force torque value by subtracting a dynamics torque value of a robot determined by inverse dynamics operation for the robot, from a speed reducer output torque value (a value produced by subtracting a torque value lost due to inertia and friction of the motor and speed reducer, from a torque value generated from a drive current of the motor) (refer to nonpatent literature 1). Disturbance estimation observer method determines a collision force using a disturbance estimation observer. In this embodiment, a description is made of a case where the former dynamics operation method is used as an example.

In FIG. 1, motor output torque value τm is represented by expression 1-1 viewed from the motor drive side, and by expression 1-2 viewed from the load side, where the speed reducer is assumed to be a rigid body.

$$\tau m = Kt \times Im \quad \text{(expression 1-1)}$$

$$\tau m = \tau dyn + \tau dis + Jm \times \alpha m + D \times \omega m + \tau \mu \quad \text{(expression 1-2)}$$

Kt: motor torque constant
Im: motor current
ωm: motor angular velocity
αm: motor angular acceleration (a derivative of motor angular velocity ωm)
Jm: motor inertia (rotor+primary side of speed reducer)
D: viscous friction coefficient
τμ: dynamic friction torque value
τdyn: dynamics torque value (the sum of gravitational force torque value, inertial force, centrifugal force, and Coriolis force)
τdis: external force torque value Dynamic friction torque value τμ can be calculated by expression 2 shown below.

$$\tau \mu = K \mu \times sgn \quad \text{(expression 2)}$$

Kμ: strength of dynamic friction
sgn=1 (ωm>0), 0 (ωm=0), −1 (ωm<0)

External force torque value τdis at the right-hand side of expression 1-2 can be determined by expression 3 deformed from expression 1-1 and expression 1-2.

$$\tau dis = Kt \times Im - (Jm \times \alpha m + D \times \omega m + K \mu \times sgn + \tau dyn) \quad \text{(expression 3)}$$

In expression 3, (Kt×Im−Jm×αm−D×ωm−Kμ×sgn) is a torque value that the motor outputs to the speed reducer.

In FIG. 1, external force torque estimating unit 30 is represented as a block for performing operation of expression 3.

In external force torque estimating unit 30, dynamics torque estimated value τdyno is determined by dynamics torque operating unit 26 executing inverse dynamics operation using feedback of motor angular velocities ωm for all the axes composing the robot and using machine parameters of the robot. Motor output torque estimated value τmo is calculated by expression 1-1 using motor current instruction Im. External force torque estimating unit 30 uses dynamics torque estimated value τdyno and motor output torque estimated value τmo to determine external force torque estimated value τdiso from expression 3, resulting in external force torque estimated value τdiso and motor output torque estimated value τmo to be output to failure determination device 32.

FIG. 2 is a block diagram showing details of failure determination device 32 in FIG. 1. A description is made of operation of failure determination device 32 using FIG. 2. In the description below, a unit time is defined as an interval at which failure determination is performed. This unit time, one hour for example, excludes time during which a robot is at a stop and represents operating time.

Unit-time averaging unit 35 calculates motor output torque average value τmA and external force torque average value τdA, which are unit-time average values of the absolute values of motor output torque estimated value τmo and external force torque estimated value τdiso, output from external force torque estimating unit 30, respectively.

This calculation method is shown in the flowchart of FIG. 3. The process of FIG. 3 is executed at every operation cycle of motor output torque estimated value τmo and external force torque estimated value τdiso.

In FIG. 3, determination is first made whether maximum angular velocity ωmMAX (the maximum absolute value out of angular velocity ωm of the relevant axis and angular velocities ωm of other axes) is larger than angular velocity threshold ωmth preliminarily determined, for determining to execute averaging process (step S301). In step S301, if maximum angular velocity ωmMAX is larger than angular velocity threshold ωmth (Y at step S301), the process proceeds to step S302; otherwise (N at step S301), the process is terminated. Here, the reason for providing the condition in step S301 is the following. That is, when a robot is at a stop due to stop operation by a user or due to waiting of sensor signal input, the stop time is indefinite. Unit-time-averaging including such a state causes variation in average values. Here, an example is taken where motor angular velocity is monitored, but other methods may be used as long as that a robot is operating can be acknowledged. For example, robot operation may be determined by such as when an operation instruction is being executed and when a position instruction is being generated.

In step S302, calculation is made of integrated value τmS of absolute values |τmo| of motor output torque estimated values, and integrated value τdS of absolute values |τdiso| of external force torque estimated values, and accumulated number of times i.

After that, in step S303, determination is made whether accumulated number of times i has reached average number of times num preliminarily determined. In step S303, if accumulated number of times i has reached average number of times num (Y in step S303), the process proceeds to step S304; otherwise (N in step S303), the process is terminated.

In step S304, integrated values τmS, τdS are divided by average number of times num to calculate motor output torque average value τmA and external force torque average value τdA, which are unit-time average values of robot operation, respectively.

For example, if the unit time of robot operation is set to 1 hour, and if motor output torque estimated value τmo and external force torque estimated value τdiso have been calculated every 10 milliseconds, then the average number of times num=360,000 times.

Next, motor output torque average value τmA and external force torque average value τdA, which are unit-time average values (e.g. average values for 1 hour), are accumulated in data accumulating unit 36. Motor output torque average value τmA of jth unit time (e.g. jth hour if the unit time is 1 hour) is defined as τmA[j]. If the present time is xth unit time and the accumulated quantity until xth time is N pieces (N is a positive integer), data from motor output torque value Tm[x−N+1] to Tm[x] are accumulated.

For example, if the present time is 1000th unit time (x=1000) and the data accumulated quantity is 48 pieces (N=48), data from motor output torque value Tm[953] to Tm[1000] are being accumulated. If the unit time is 1 hour, data For 48-hour robot operation time are to be accumulated. This situation is similar to external force torque average value τdA[j].

Moving averaging unit 37 determines present moving averages τmAA[x] and τdAA[x] of N pieces of data accumulated in data accumulating unit 36 for a motor output torque average value of xth unit time and an external force torque average value of xth time by expression 4-1 and expression 4-2, respectively.

$$\tau mAA[x] = \left( \sum_{j=x-N+1}^{x} \tau mA[j] \right) / N \quad \text{(expression 4-1)}$$

$$\tau dAA[x] = \left( \sum_{j=x-N+1}^{x} \tau dA[j] \right) / N \quad \text{(expression 4-2)}$$

Failure determination reference value setting unit 38 determines whether data from τmA[x−NN+1] (NN is a positive integer) to τmA[x] (τmA is an average value of motor output torque value in a unit time) fall within a certain range of variation, with moving average value τmAA[x] of N pieces of unit times as a reference, on the basis of the flowchart of FIG. 4. In other words, determination is made whether the difference between τmA[j] (an average value in NN pieces of unit times) and τmAA[j] (a moving average value in N pieces of unit times) is smaller than a given value preliminarily determined. Consequently, if the difference is within a certain range, moving average value TmAA[x] of N pieces of unit times is set as a reference value. After that, motor output torque failure determination reference value τmth (first failure determination value) and external force torque failure determination reference value τdth (second failure determination value) shown in FIG. 2 are determined on the basis of the reference value of moving average value τmAA[x] having been set, and failure determination reference value set flag fth is set to 1.

Hereinafter, the flowchart of FIG. 4 is described. The process of the flowchart shown in FIG. 4 is executed every failure determination unit time. In step S401 of FIG. 4, determination is made whether failure determination reference value set flag fth is 0. In step S401, if failure determination reference value set flag fth is 0 (Y in step S401), which means a failure determination reference value is not set, the process proceeds to step S402. In step S401, if failure determination reference value set flag fth is 1 (N in step S401), which means a failure determination reference value is already set, the process is terminated.

In step S402, determination is made whether the absolute value of the difference between average value TmA[x−k] of motor output torque values and moving average value TmAA[x] is smaller than threshold Tmth1 for determining variation in unit-time average. If the absolute value of the difference between average value TmA[x−k] of motor output torque values and moving average value TmAA[x] is smaller than threshold Tmth1 (Y in step S402), the process shifts to step S403; otherwise (N in step S402), the process is terminated. Here, threshold Tmth1 can be preliminarily determined experimentally for example. In this embodiment shown in FIG. 5, threshold τmth1 is set to 5% of a motor maximum torque value. The smaller this value is, the longer it takes to determine motor-generated torque failure determination reference value τmth until the load rate becomes stably constant. That is to say, while the validity of a reference value improves, the reference value is not determined shortly, resulting in failure determination delayed for a long time. Hence, this value may be determined to an appropriate value according to the actual usage.

In step S403, 1 is added to operation step count k. In step S404, determination is made whether operation step count k has reached NN times (variation determination quantity). In step S403, if operation step count k has reached NN times (Y in step S403), determination is made as the control system is stable, and the process shifts to step S405. If operation step count k has not reached NN times (N in step S403), determination is made as the control system is still unstable, and the process returns to step S402.

In step S405, motor output torque failure determination reference value Tmth is calculated on the basis of moving average value TmAA[x] when NN pieces of motor output torque average values TmA[x] are within a certain variation range. Further, external force torque failure determination reference value τdth at this moment is calculated; failure determination reference value set flag fth; is set to 1; and the process is terminated. Here, motor output torque failure determination reference value τmth is produced by adding added value Tmth2 (first given value) for setting a motor output torque failure reference value to moving average value TmAA[x]. External force torque failure determination reference value Tdth at this moment is produced by adding added value Tdth2 (second given value) for setting an external force torque failure determination reference value to moving average value TdAA[x]. Here, added value Tmth2 (for setting a motor output torque failure reference value) and added value Tdth2 (for setting an external force torque failure determination reference value) can be preliminarily determined experimentally for example. In this embodiment shown in FIG. 6, they are set to 8% of a motor maximum torque value. In this embodiment shown in FIG. 7, they are set to 5%. The smaller these values are, the higher the sensitivity of failure determination becomes, but so is the possibility of erroneous decision. Hence, this value may be determined to an appropriate value according to the actual usage.

Figure 5:
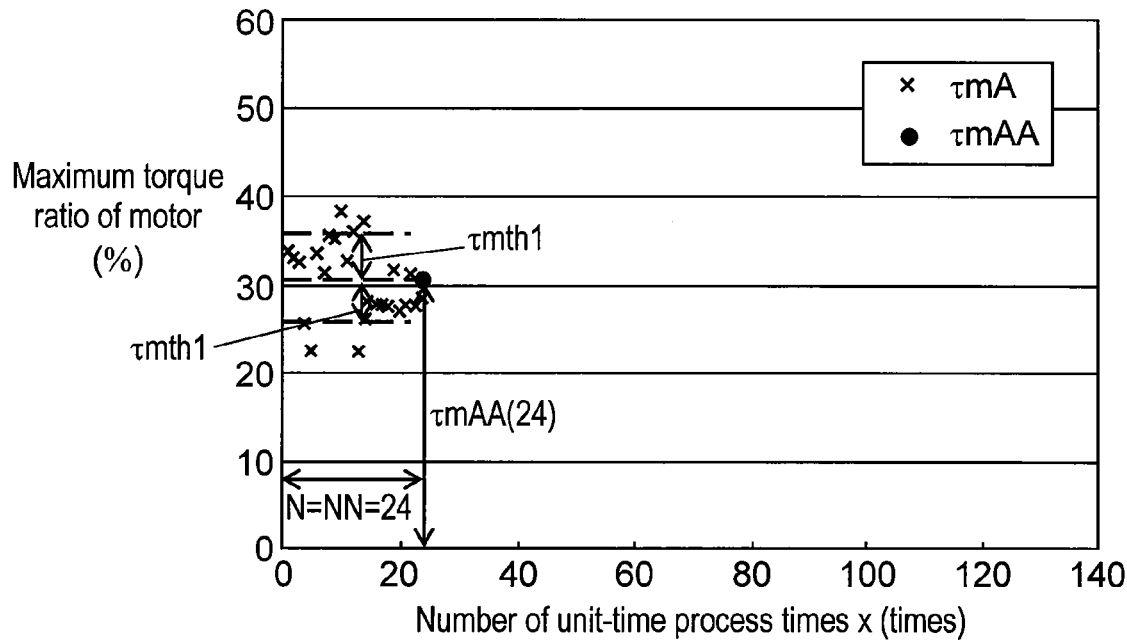
FIG. 5 is a first explanatory drawing of the failure determination reference value setting process on the basis of a motor output torque moving average value in the flowchart of FIG. 4.
Figure 6:
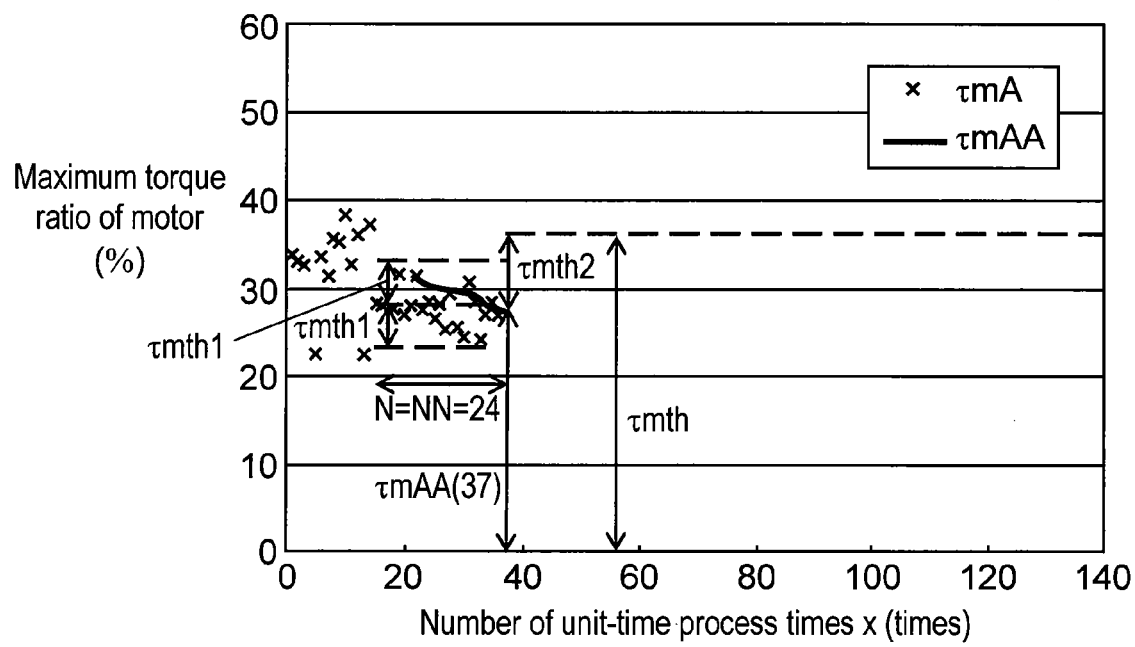
FIG. 6 is a second explanatory drawing of the failure determination reference value setting process on the basis of a motor output torque moving average value in the flowchart of FIG. 4.
Figure 7:
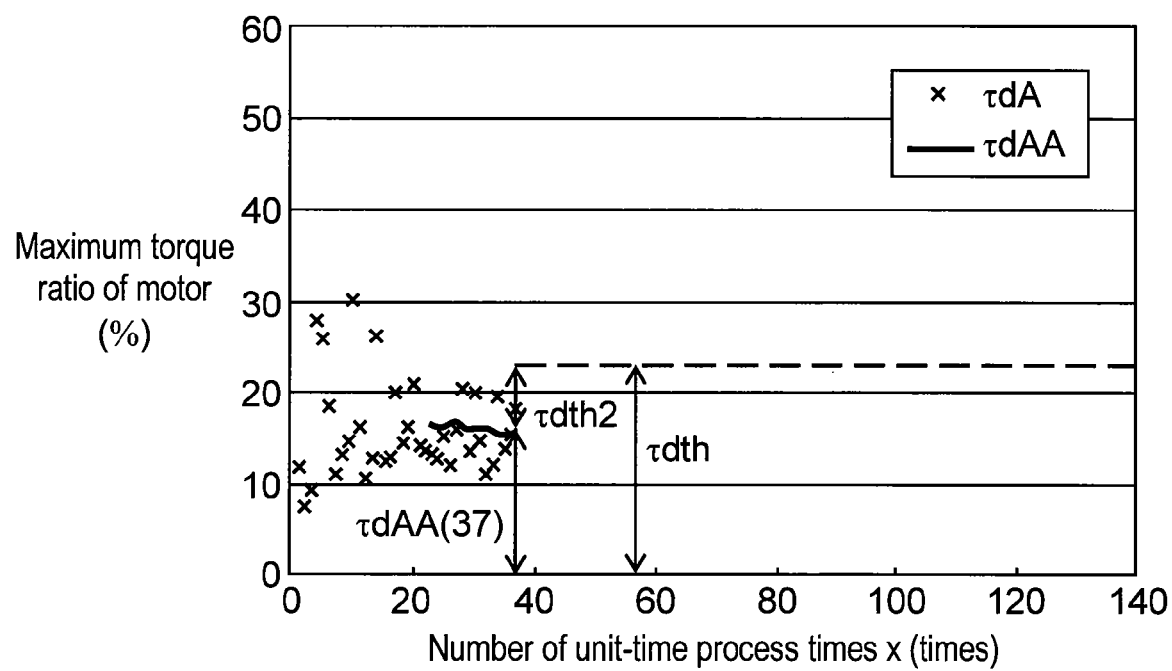
FIG. 7 is an explanatory drawing of the failure determination reference value setting process on the basis of an external force torque moving average value in the flowchart of FIG. 4.

Waveforms for describing the process so far are shown in FIGS. 5, 6, 7. FIG. 5 is a first drawing for illustrating failure determination reference value setting process on the basis of a motor output torque moving average value in the flowchart of FIG. 4. In FIG. 5, the horizontal axis represents the number of unit-time process times x (e.g. x hours if the unit time is 1 hour). The vertical axis represents a ratio of motor output torque average value τmA to a motor torque maximum value. To be easily understood, the expression "ratio" is not used, but simply such as "motor output torque average value τmA" is used in this embodiment. An "x" mark indicates within-a-unit-time average value τmA of a motor output torque value, and a solid line (black point in FIG. 5) represents moving average values τmAA in N pieces of unit times. FIG. 5 shows a case where accumulated quantity (moving average quantity) N and variation determination quantity NN are 24, and moving average τmAA[24] is calculated for the first time when x=24. At this moment, moving averages τmAA[1] through τmA[24] range beyond moving average τmAA[24] ±τmth1. Consequently, the conditional expression in step S402 of FIG. 4 is not satisfied, and thus motor output torque failure determination reference value τmth is not calculated in step S405.

FIG. 6 shows a waveform when time has elapsed to x=37 similarly to FIG. 5. In FIG. 6, all the 24 pieces (corresponding to NN pieces) of motor output torque average values τmA[14] through τmA[37] range within moving average value τmAA[37] (37th, 24 pieces of unit times) ±τmth1, satisfying the conditional expression in step S402 of FIG. 4. Hence, motor output torque failure determination reference value τmth is calculated in step S405, and failure determination reference value set flag fth is set to 1. Concretely, motor output torque failure determination reference value τmth is produced by adding added value τmth2 for setting a motor output torque failure determination threshold to moving average value τmAA[37] (37th, 24 pieces of unit times) as a reference value.

FIG. 7 shows change of an external force torque value, as a waveform when time has elapsed to x=37 similarly to FIG. 6. An "x" mark indicates within-a-unit-time average value τdA of an external force torque value, and a solid line represents moving average values τdAA in N pieces of unit times. As described above, the reference value of a motor output torque average value are set at the time of x=37. Hence in FIG. 7, external force torque failure determination reference value τdth in step S405 of FIG. 4 is calculated at this moment. Concretely, external force torque failure determination reference value τdth is produced by adding added value τdth2 for setting a motor output torque failure determination threshold to moving average value τdAA[37] (37th, 24 pieces of unit times) as a reference value.

As proved from FIGS. 4, 5, motor output torque average value TmA when the difference between motor output torque value Tm and motor output torque average value TmA is smaller than given value Tmth1 preliminarily determined is set as the reference value of a motor output torque average value. External force torque estimated average value TdA at this moment is set as the reference value TdAR of an external force torque estimated average value.

In other words, if all the N pieces of continuous motor output torque average values τmA range within ±τmth1, it means the reference value of a motor output torque average value has been obtained.

As described above, motor output torque failure determination reference value τmth and external force torque failure determination reference value τdth are calculated at the time when variation of average value TmA of motor output torque values is reduced at the condition judgement in step S402 of FIG. 4. In other words, when the usage of a robot is settled, they are automatically calculated according to an operation pattern of a robot on the basis of a program preliminarily stored. Accordingly, reference data does not need to be measured preliminarily, or a robot does not need to be operated in a reference operation pattern.

Figure 8:
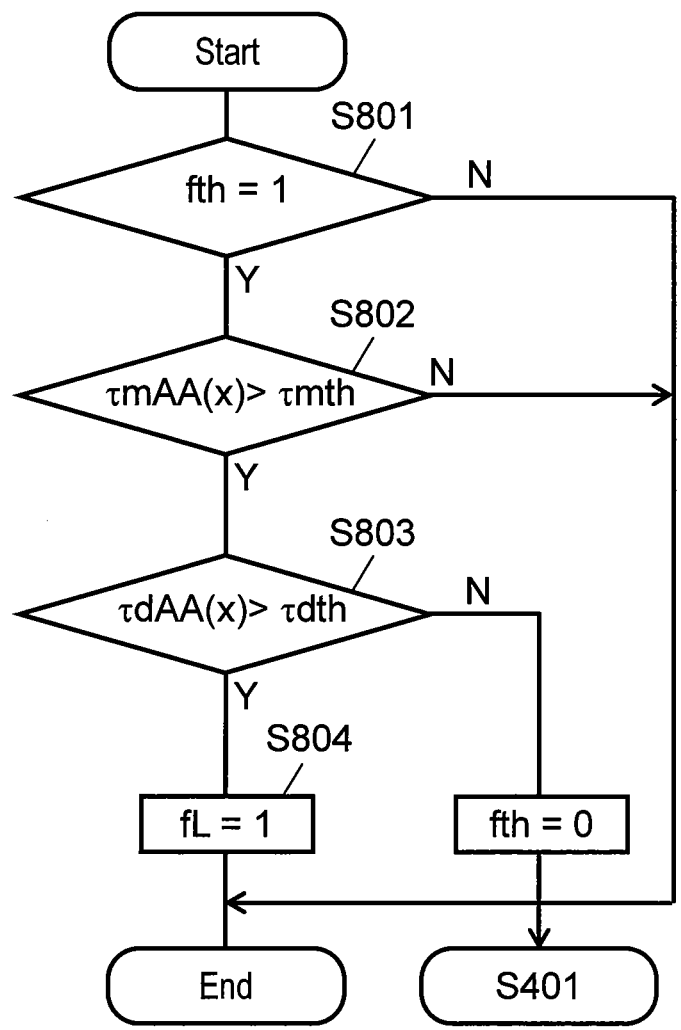
FIG. 8 is a flowchart illustrating the failure determination process in the method of determining a failure of a robot according to the embodiment.

Failure determining unit 40 in FIG. 2 performs failure determination according to the flowchart of FIG. 8. The process in FIG. 8 is executed at every failure determination unit time (e.g. every 1 hour). In step S801 of FIG. 8, judgement is made whether failure determination reference value set flag fth is set to 1. In step S801, if failure determination reference value set flag fth is set to 1 (Y in step S801), the process proceeds to step S802; otherwise (N in step S801), the process is terminated.

In step S802, judgement is made whether moving average value τmAA of motor output torque values is larger than motor output torque failure determination reference value τmth. In step S802, if moving average value τmAA[x] of motor output torque values is larger than motor output torque failure determination reference value τmth (Y in step S802), the process proceeds to step S803; otherwise (N in step S802), the process is terminated.

In step S803, judgement is made whether moving average value τdAA of external force torque values is larger than external force torque failure determination reference value τdth. In step S803, if moving average value τdAA[x] of external force torque values is larger than external force torque failure determination reference value τdth (Y in step S803), the process proceeds to step S804; otherwise (N in step S803), to step S805.

In step S804, 1 is set to failure determination flag fL and the process is terminated. In step S805, failure determination reference value set flag fth is set to 0 and the process (the flowchart of FIG. 4) by failure determination reference value setting unit 38 is resumed.

Figure 9:
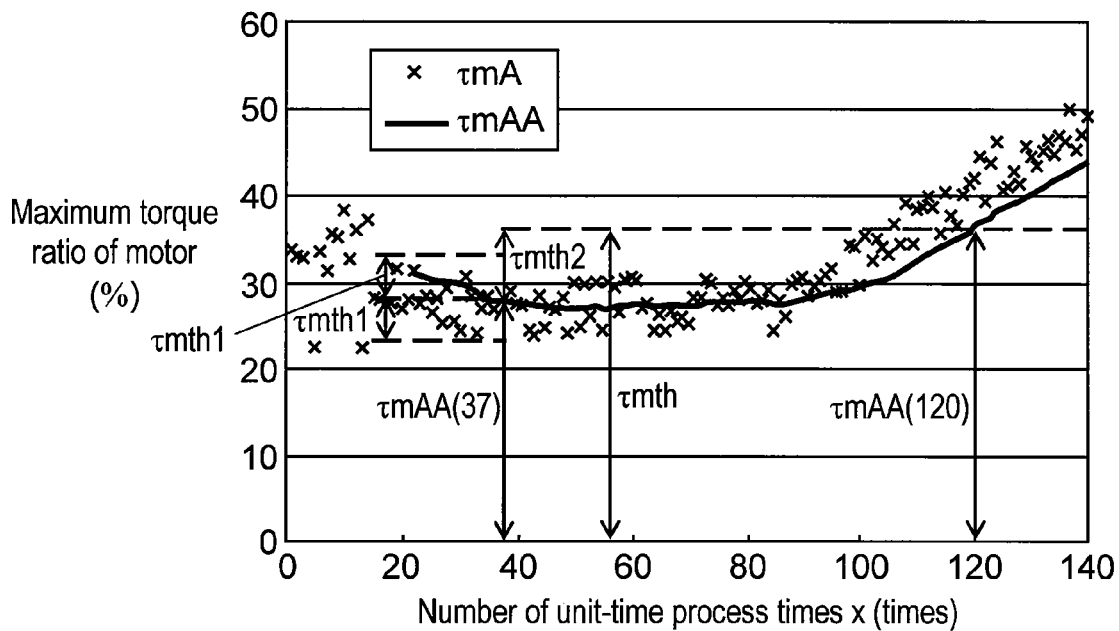
FIG. 9 is an explanatory drawing of the failure determination process on the basis of a motor output torque moving average value in the flowchart of FIG. 8.
Figure 10:
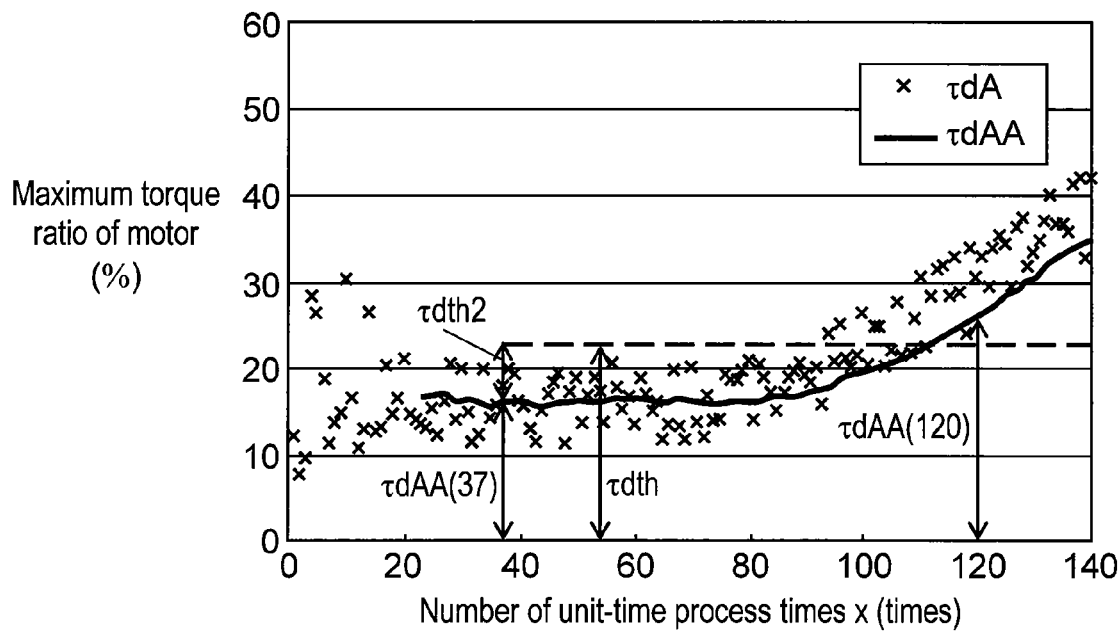
FIG. 10 is an explanatory drawing of the failure determination process on the basis of an external force torque moving average value in the flowchart of FIG. 8.

Waveform charts for illustrating the process of FIG. 8 are shown in FIGS. 9, 10. FIG. 9 shows a waveform that is the waveform of FIG. 6 when time has elapsed to x=140 times. In FIG. 9, friction due to a failure gradually increases moving average value τmAA[x] of motor output torque values from near x=90th time. At x=120th time, moving average value τmAA[x] exceeds motor output torque failure determination reference value τmth, satisfying the condition of step S802.

FIG. 10 shows a waveform that is the waveform of FIG. 7 when time has elapsed to x=140 times. In FIG. 10, at x=120th time, moving average value τdAA[120] of external force torque values exceeds external force torque failure determination reference value τdth, satisfying the condition of step S803. In step S804, failure determination flag fL is set to 1, and failure warning display unit 34 in FIG. 1 performs failure warning process.

In FIG. 10, if moving average value τdAA[120] of external force torque values is below external force torque failure determination reference value τdth at x=120th time, the condition of step S803 is not satisfied. In this case, determination reference value set flag fth is set to 0, and the process (the flowchart of FIG. 4) by failure determination reference value setting unit 38 is resumed. That is, the process of determining motor output torque failure determination reference value τmth and external force torque failure determination reference value τdth is performed again, and failure judgement process is performed with these values as new reference values.

In step S802 and step S803, why determination is made by both increases of moving average value τmAA of motor output torque values and moving average value τdAA of external force torque value is as follows. That is, in some cases, while moving average value τdAA of external force torque values increases, moving average value τmAA of motor output torque values decreases. The reason is to avoid erroneous decision in such a case. An example where an increase of tensile force of a cable bears the gravitational force of a robot falls under such a case.

Further, while moving average value τmAA of motor output torque values increases, moving average value τdAA of external force torque values does not sometimes increase. To avoid erroneous decision in such a case, judgement is made by both increases of moving average value τmAA of motor output torque values and moving average value τdAA of external force torque value in step S802 and step S803. For example, when process details of a robot change and the robot program is rewritten by a user, motor output torque average value TmA can increase. However, external force torque average value TdA does not increase when parameters of an attached load have been input correctly because an external force does not especially increase.

Meanwhile, the present invention enables the probability of erroneous decision about failure determination to be decreased even if parameters of an attached load have not been input correctly.

External force estimated torque value τdiso calculated by expression 3 does not become 0 because even if actual external force torque value τdis is 0, calculation of dynamics torque value τdyn produces an error if parameters of an attached load contain an error. Assuming that a dynamics torque value containing an error is τdyn_err, and this estimated error is Δτdis, expression 5 holds.

$$\Delta\tau dis = Kt \times Im - (Jm \times \alpha + D \times \omega m + K\mu \times sgn + \tau dyn\_err) \quad \text{(expression 5)}$$

If the friction torque value increases by Δτμ due to an actual failure with this dynamics torque operation containing an error, external force torque estimated value τdiso is calculated by expression 6.

$$\tau diso = Kt \times Im - \quad \text{(expression 6)}$$
$$(Jm \times \alpha + D \times \omega m + (\tau\mu + \Delta\tau\mu) \times sgn + \tau dyn\_err) =$$
$$\Delta\tau dis + \Delta\tau\mu \times sgn$$

In expression 6, if |Δτμ|>|Δτdis|, that is to say, when an error is contained in dynamics torque operation, if an increase of a friction torque value due to a failure exceeds the estimated error caused by the error contained in the dynamics torque operation, the absolute value of external force torque estimated value τdiso can be expressed by expression 7-1 and expression 7-2 regardless of the sign of Δτdis.

$$|\tau diso[+]| = \Delta\tau dis + \Delta\tau\mu \quad \text{(expression 7-1)}$$

$$|\tau diso[-]| = -\Delta\tau dis + \Delta\tau\mu \quad \text{(expression 7-2)}$$

|τdiso[+]|: the absolute value of an external force torque estimated value while a motor is rotating in the forward direction

|τdiso[−]|: the absolute value of an external force torque estimated value while a motor is rotating in the reverse direction Here, assuming that the unit-time averages of Δτdis and Δτμ are ΔτdA and ΔτμA, respectively, unit-time average τdA of absolute values of external force torque estimated values τdiso can be expressed by expression 8-1 and expression 8-2.

$$\tau dA[+] = \Delta\tau dA + \Delta\tau\mu A \quad \text{(expression 8-1)}$$

$$\tau dA[-] = -\Delta\tau dA + \Delta\tau\mu A \quad \text{(expression 8-2)}$$

τdA[+]: the unit-time average of absolute values of external force torque estimated values while a motor is rotating in the forward direction τdA[−]: the unit-time average of absolute values of external force torque estimated values while a motor is rotating in the reverse direction Here, the operation angle of an industrial robot is finite, at the most approximately ±360 degrees, and thus a motor driving the robot does not continue rotating in only one direction. The difference between a rotation angle in the forward direction and that in the reverse direction is 720 degrees at a maximum. For example, the total rotation angle exceeds several tens of thousands of degrees in most cases if the unit time for failure determination is 1 hour, and thus the rotation angle in the forward direction may be considered nearly the same as that in the reverse direction.

Hence, unit-time average TdA of external force torque estimated values can be calculated by averaging τdA[+] and τdA[−] and thus expressed by expression 9.

$$\tau dA = (\tau dA[+] + \tau dA[-])/2 \quad \text{(expression 9)}$$
$$= (\Delta\tau dA + \Delta\tau\mu A - \Delta\tau dA + \Delta\tau\mu A)/2$$
$$= \Delta\tau\mu A$$

Expression 9 proves that friction torque value increase ΔτμA caused by a failure can be correctly determined even if accurate load parameters are not input and dynamics torque operation contains an error, if friction torque value increase ΔτμA caused by a failure exceeds estimated error ΔτdA caused by the error.

That is to say, when accurate load parameters are not input, a case where the condition in step S803 in the flowchart of FIG. 8 is not satisfied occurs at the time when the friction torque value increase ΔτμA is lower than error ΔτdA caused by a parameter error, even if friction actually increases due to a failure. Hence, the process (the flowchart of FIG. 4) by failure determination reference value setting unit 38 is resumed in this case, and failure determination threshold τdth is set again. However, when friction torque value increase ΔτμA further proceeds and exceeds error ΔτdA caused by a parameter error, friction torque value increase ΔτμA is correctly reflected on external force torque estimated average value τdA. Hence, correct determination is made in step S803. From the above description, the probability of erroneous decision can be reduced.

In this embodiment, the description is made of a case where a motor output torque value is prioritized. However, failure determination can be made with an external force torque value prioritized by changing the order of failure determination for a motor output torque value and an external force torque value.

Specifically, determination is first made while a robot is operating whether external force torque estimated average value TdA (an average value of N pieces of external force torque estimated values Td) exceeds second failure determination reference value Tdth (a value produced by adding second given value Tdth2 to external force torque estimated average reference value TdAR obtained from given N pieces of external force torque estimated average values TdA). Next, determination is made while a robot is operating whether motor output torque average value TmA (an average value of N pieces of motor output torque values Tm) exceeds first failure determination reference value Tmth (a value produced by adding first given value Tmth2 to motor output torque average reference value TmAR obtained from given N pieces of motor output torque average values TmA). Consequently, determination is made as a failure if external force torque estimated average value TdA exceeds second failure determination reference value Tdth2 and motor output torque average value TmA exceeds first failure determination reference value Tmth.

In this case, external force torque estimated average value TdA when the difference between N pieces of external force torque estimated values Td and external force torque estimated average value TdA is smaller than given value Tmth1 preliminarily determined is set as reference value TdAR of the external force torque estimated average value, and motor output torque average value TmA at this moment is set as reference value TmAR of the motor output torque average value.

Failure judgement process may be performed by another way. That is, when an external force torque estimated moving average value exceeds a failure determination reference value, but a motor output torque moving average value does not exceed a failure determination reference value, the process (the flowchart of FIG. 4) by failure determination reference value setting unit 38 is resumed. The process for determining motor output torque failure determination reference value τmth and external force torque failure determination reference value τdth is performed again. These values are used as new reference values to perform failure judgement process.

In this embodiment, the example is shown where added value τmth2 for setting a motor output torque failure determination value to N pieces of moving average values τmAA of absolute values of motor output torque values, to calculate a motor output torque failure determination value, and then determination is made whether N pieces of moving average values τmAA of absolute values of subsequent motor output torque values exceed the motor output torque failure determination value to determine a failure. However, determination may be made whether the difference between a motor output torque moving average value and the motor output torque moving average reference value exceed a given value to determine a failure. Here, the given value can be preliminarily determined experimentally for example.

In this embodiment, the example is shown where added value τdth2 for setting an external force torque failure determination value to N pieces of moving average values τdAA of absolute values of external force torque values to calculate an external force torque failure determination value, and then determination is made whether N pieces of moving average values τdAA of absolute values of subsequent external force torque values exceed the external force torque failure determination value to determine a failure. However, determination may be made whether the difference between an external force torque moving average value and the external force torque moving average reference value exceeds a given value to determine a failure. Here, the given value can be preliminarily determined experimentally for example.

Further, in this embodiment, calculation is first made of another average value TmA of motor output torque values Tm within a unit time, and then motor output torque average value TmAA is determined from other N pieces of average values TmA. However, motor output torque average value TmAA can be determined from motor output torque value Tm without requiring to determine the above-described another average value TmA. This fact applies to a case of determining external force torque estimated average value TdA as well.

In this embodiment, failure judgement is made for one arbitrary motor. However, for an articulated robot equipped with plural motors, failure judgement is made for all the motors or a specific motor in the same way as in this embodiment.

A robot of this embodiment includes a servomotor for example, and failure determination is made for this servomotor.

INDUSTRIAL APPLICABILITY

The present invention does not need to measure or store reference data; is able to determine while the production line is operating; and reduces the probability of erroneous decision when accurate load parameter are not input or an external force is exerted, and thus is useful as a method of determining a failure of a robot in operation.

REFERENCE MARKS IN THE DRAWINGS

6 Position control unit
10 Velocity control unit
18 Motor/external force torque unit
21 Direction determining unit
26 Dynamics torque operating unit
30 External force torque estimating unit
32 Failure determination device
34 Failure warning display unit
35 Unit-time averaging unit
36 Data accumulating unit
37 Moving averaging unit
38 Failure determination reference value setting unit
40 Failure determining unit
101 Welding wire
103 Wire feeding motor
104 Welding torch
105 Welding power supply unit
107 Base material
108 Arc
109 Robot
110 Robot control unit
111 Torch cable
112 Jig

The invention claimed is:

1. A method of determining a failure of a robot, comprising:
a step of determining a first failure determination reference value by adding a first given value to a motor output torque moving average reference value, the motor output torque moving average reference value being set when a difference between a motor output torque average value and a first motor output torque moving average value is smaller than a predetermined value at a time;
a step of determining with a failure determination device, while a robot is operating, whether or not a second motor output torque moving average value, which is a moving average value of N (N is a positive integer) pieces of motor output torque average values exceeds the first failure determination reference value;
a step of determining a second failure determination reference value by adding a second given value to an external force torque moving average reference value, the external force torque moving average reference value being set at the time;
a step of determining with failure determination device, while the robot is operating, whether or not an external force torque moving average value, which is a moving average value of N pieces of external force torque average values, exceeds the second failure determination reference value; and
a step of determining the operation of the robot as a failure with the failure determination device if the second motor output torque moving average value exceeds the first failure determination reference value and the external force moving average value exceeds the second failure determination reference value, wherein each motor output torque average value is the average of a motor output torque value within a unit time preliminarily determined and each external force torque average value is the average of an external force torque estimated value within a unit time preliminarily determined, the motor output torque value and the external force torque estimated value are determined from data obtained by a motor/external force torque unit coupled to the motor and the robot.

2. The method of determining a failure of a robot of claim 1, wherein, in the step of setting the first motor output torque moving average value, the first motor output torque moving average value is set when a difference between each of NN (NN is a positive integer) pieces of motor output torque average values and the first motor output torque moving average value is smaller than a given value preliminarily determined, as the motor output torque moving average reference value, and the external force torque moving average value is set at this moment as the external force torque moving average reference value.

3. A method of determining a failure of a robot, comprising:

a step of setting a motor output torque moving average reference value when a difference between a motor output torque average value and a first motor output torque moving average value is smaller than a predetermined value at a time;

a step of determining with a failure determination device, while a robot is operating, whether or not the difference between a second motor output torque moving average value, which is moving average value of N (N is a positive integer) pieces of motor output torque average values, and the motor output torque moving average reference value exceeds a first given value;

a step of setting an external force torque moving average reference value at the time;

a step of determining with the failure determination device, while the robot is operating whether or not the difference between an external force torque moving average value, which is a moving average value of N pieces of external force torque average values, and the external force torque moving average reference value exceeds a second given value; and a step of determining the operation of the robot as a failure with the failure determination device if the difference between the second motor output torque moving average value and the motor output torque moving average reference value exceeds the first given value, and the difference between the external force torque moving average value and the external force torque moving average reference value exceeds the second given value, wherein each motor output torque average value is the average of a motor output torque value within a unit time preliminarily determined and each external force torque average value is the average of an external force torque estimated value within a unit time preliminarily determined, the motor output torque value and the external force torque estimated value are determined from data obtained by a motor/external force torque unit coupled to the motor and the robot.

4. The method of determining a failure of a robot of claim 3, wherein, in the step of setting the first motor output torque moving average value, the first motor output torque moving average value is set when a difference between each of NN pieces of motor output torque average values and the first motor output torque moving average value is smaller than a given value preliminarily determined, as the motor output torque moving average reference value, and the external force torque moving average value is set at this moment as the external force torque moving average reference value.

* * * * *